(12) United States Patent
Brenneke et al.

(10) Patent No.: US 7,364,141 B2
(45) Date of Patent: Apr. 29, 2008

(54) FLUID COOLER WITH EVAPORATIVE HEAT EXCHANGER

(75) Inventors: Glenn Brenneke, Lee's Summit, MO (US); Hobart Cox, Greenwood, MO (US); Mark Kauffmann, Merriam, KS (US); Jason Stratman, Lee's Summit, MO (US); Eric Wiedemann, Overland Park, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 66 days.

(21) Appl. No.: 11/068,387

(22) Filed: Mar. 1, 2005

(65) Prior Publication Data

US 2006/0197241 A1 Sep. 7, 2006

(51) Int. Cl.
*B01F 3/04* (2006.01)
(52) U.S. Cl. .................. 261/146; 261/152; 261/29; 261/95; 261/112.1; 261/DIG. 11
(58) Field of Classification Search ............... 261/146, 261/149, 152, 29, 95, 102, 103, 112.1, 112.2, 261/DIG. 11, 97, 110
See application file for complete search history.

(56) References Cited

U.S. PATENT DOCUMENTS

| | | | | |
|---|---|---|---|---|
| 1,928,904 A | * | 10/1933 | Mart | 261/111 |
| 3,268,217 A | * | 8/1966 | Goitein | 261/110 |
| 3,800,553 A | * | 4/1974 | Engalitcheff, Jr. | 62/310 |
| 4,112,027 A | | 9/1978 | Cates | 261/151 |
| 4,514,202 A | | 4/1985 | Kinney, Jr. et al. | 55/440 |
| 4,574,202 A | | 3/1986 | Ogawa | 307/261 |
| 4,683,101 A | * | 7/1987 | Cates | 261/146 |
| 4,893,669 A | * | 1/1990 | Kashiwada et al. | 165/282 |
| 5,435,382 A | * | 7/1995 | Carter | 165/110 |
| 5,505,883 A | * | 4/1996 | Kato | 261/153 |
| 5,724,828 A | * | 3/1998 | Korenic | 62/305 |
| 5,944,094 A | * | 8/1999 | Kinney et al. | 165/166 |
| 6,142,219 A | * | 11/2000 | Korenic et al. | 165/110 |
| 7,232,116 B2 | * | 6/2007 | Stratman et al. | 261/146 |

OTHER PUBLICATIONS

U.S. Appl. No. 11/068,389, filed Mar. 1, 2005 and allowed Mar. 13, 2007.
U.S. Appl. No. 11/068,388, filed Mar. 1, 2005.

* cited by examiner

*Primary Examiner*—Scott Bushey
(74) *Attorney, Agent, or Firm*—Baker & Hostetler LLP

(57) ABSTRACT

A cooling tower and/or a fan drive system are provided which enhance cooling performance, are able to reduce lateral temperature gradients at least to some degree, provide for easy removable of debris and/or provide for easy fan adjustment.

18 Claims, 9 Drawing Sheets

FLUID COOLER WITH EVAPORATIVE HEAT EXCHANGER

FIELD OF THE INVENTION

The present invention relates generally to fluid cooling devices, and more particularly relates in some aspects to a combination cooling apparatus that includes a closed loop coil heat exchanger section together with an evaporative water cooler section. The invention further pertains in other aspects to fan drive systems used to drive air fans associated with cooling towers.

BACKGROUND OF THE INVENTION

Many cooling devices are in wide use industry. Some of these devices are referred to as "fluid coolers" and are used to cool and return fluid from devices such as water source heat pumps, chillers, cooling jackets, or other systems that produce relatively hot water and require the return of relatively cooler water. Such cooling devices include different types such as closed looped systems, which often feature a serpentine heat exchange coil, and open loop or evaporative systems, which pass the water through fill media such as a sheet pack or over a series of splash bars before collecting the water in a basin.

One particularly advantageous arrangement combines these two features, such as for example the arrangement described in U.S. Pat. No. 4,112,027, the disclosure of which is hereby incorporated by reference in its entirety. This patent describes a high efficiency, induced draft, combination counter-flow-crossflow fluid cooling apparatus and method which gives unexpectedly enhanced cooling of hot fluid by causing the fluid to pass upwardly through a series of serpentine heat exchange conduits in primarily counter-current, indirect sensible heat exchange relationship with external cooling water gravitating from an overlying evaporative water cooling section. Crossflowing air currents are pulled through the apparatus to evaporatively cool the water not only in the upper cooling section but also in the sensible heat exchange area as well. Countercurrent flow of coolant water and fluid to be collected ensures that the coldest water and coldest fluid are in thermal interchange during the final stages of fluid cooling at the upper ends of the heat exchange conduits, so that the fluid temperature can approach that of the cold water as opposed to approaching the temperature of heated water found adjacent the lower ends of the conduits, which is conventional in cocurrent fluid units of this type. The fluid conduit system is preferably arranged for causing increased fluid residence time, and thereby greatest temperature difference and longer heat exchange between the fluid and coolant water adjacent the air inlet of the apparatus where air and coolant water temperatures are lowest relative to the fluid to be cooled, so that an ideal countercurrent flow relationship is obtained and maximum heat transfer is assured. An underlying water collection basin is also employed in the apparatus which is constructed to permit collection of cooling water to a level above that of the lowermost portions of the hot fluid conduits, in order to allow the hot fluid traveling through the conduits to heat the collected water to prevent freezing thereof during wintertime operations when the internal water pump is shut down causing the stoppage of the evaporative cooling and hence a raising of the lower water basin level.

The above described system, while providing excellent performance, can still be improved upon. In, particular it has been noted that temperature gradients occur in the upper evaporative fill material, because the air is heated as it passes horizontally across the upper fill material, so that the water near the air inlet side tends to be cooled more effectively than the water near the air exit side, thus resulting in a temperature differential in the cooling water as it falls off the fill and reaches the serpentine heat exchanger conduits. Thus, the effectiveness of the heat exchanger conduits is also subject to a temperature gradient across the horizontal width of the tower.

Thus, it would be desirable to provide a more even temperature gradient in the cooling water that is provided onto the heat exchanger.

Also, sometimes debris or particulates are drawn into the upper fill material, and/or minerals or other materials in the water collect or form in the upper fill material. Such debris can fall down onto the serpentine heat transfer coils, impairing their efficiency, and being difficult to remove.

Turning to another aspect of cooling towers in general, it is sometimes desirable to have a cooling tower with two fans operating in parallel next to each other. Conventional arrangements for providing a single drive motor connected by pulleys to two fans have heretofore been somewhat cumbersome and difficult to adjust. Simplifying the adjustment of two fans each driven by belts connected to a single motor pulley would be highly desirable, especially since the belt tends to extend or stretch over time and such adjustment is periodically required.

In view of the foregoing, it would be desirable to have a cooling tower and/or a fan drive system that provides enhanced cooling performance, that is able to reduce lateral temperature gradients at least to some degree, that provides for easy removal of debris and/or provides for easy fan adjustment.

SUMMARY OF THE INVENTION

The foregoing needs are met, to a great extent, by the present invention, wherein in one aspect an apparatus is provided that in some embodiments provides enhance cooling performance, that is able to reduce lateral temperature gradients at least to some degree, that provides for easy removal of debris and/or provides for easy fan adjustment.

In one aspect, a cooling tower apparatus comprises an evaporative fill media having a first air path; a supply of cooling water to the fill media; a closed circuit heat exchanger disposed below the evaporative fill media having a second air path; a baffle between the fill media and the heat exchanger that at least substantially separates the first and second air paths; and an air drift reducer disposed adjacent the heat exchanger, the drift reducer having a vertical axis perpendicular to a major air flow axis and an exit air flow direction, wherein the vertical axis of the drift reducer is angled relative to the vertical direction.

In another aspect, a cooling tower apparatus comprises evaporative water cooling means having a first air path; means for supplying cooled water to the cooling means; a closed circuit heat exchanging means disposed below the evaporative fill media having a second air path; means for at least substantially separating the first and second air paths, disposed between the cooling means and the heat exchanging means; and means for reducing drift disposed adjacent the heat exchanging means, the drift reducing means having a vertical axis perpendicular to a major air flow axis and an exit air flow direction, wherein the vertical axis of the drift reducing means is angled relative to the vertical direction.

In another aspect, a method for cooling a fluid comprises passing cooling water over an evaporative fill media; passing fluid to be cooled through a closed circuit heat exchanger disposed below the evaporative fill media; at least substantially separating the first and second air paths from each other; and reducing drift via a drift eliminator disposed adjacent the heat exchanger and turning the air via the drift eliminator being angled relative to vertical.

In another aspect, a cooling tower apparatus comprises an evaporative fill media having a first air path; a supply of cooling water to the fill media; a closed circuit heat exchanger having a second air path disposed below the evaporative fill media; and a baffle between the fill media and the heat exchanger that at least substantially separates the first and second air paths.

In another aspect, a cooling tower apparatus comprises evaporative water cooling means having a first air path; means for supplying cooled water to the cooling means having a second air path; a closed circuit heat exchanging means disposed below the evaporative fill media; and means for at least substantially separating the first and second air paths, disposed between the cooling means and the heat exchanging means.

In another aspect, a method for cooling a fluid comprises passing cooling water over an evaporative fill media having a first air path; passing fluid to be cooled through a closed circuit heat exchanger disposed below the evaporative fill media having a second air path; at least substantially separating the first and second air paths from each other.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

In various embodiments, a cooling tower and/or a fan drive system are provided which enhance cooling performance, are able to reduce lateral temperature gradients at least to some degree, provide for easy removable of debris and/or provide for easy fan adjustment.

Figure 1:
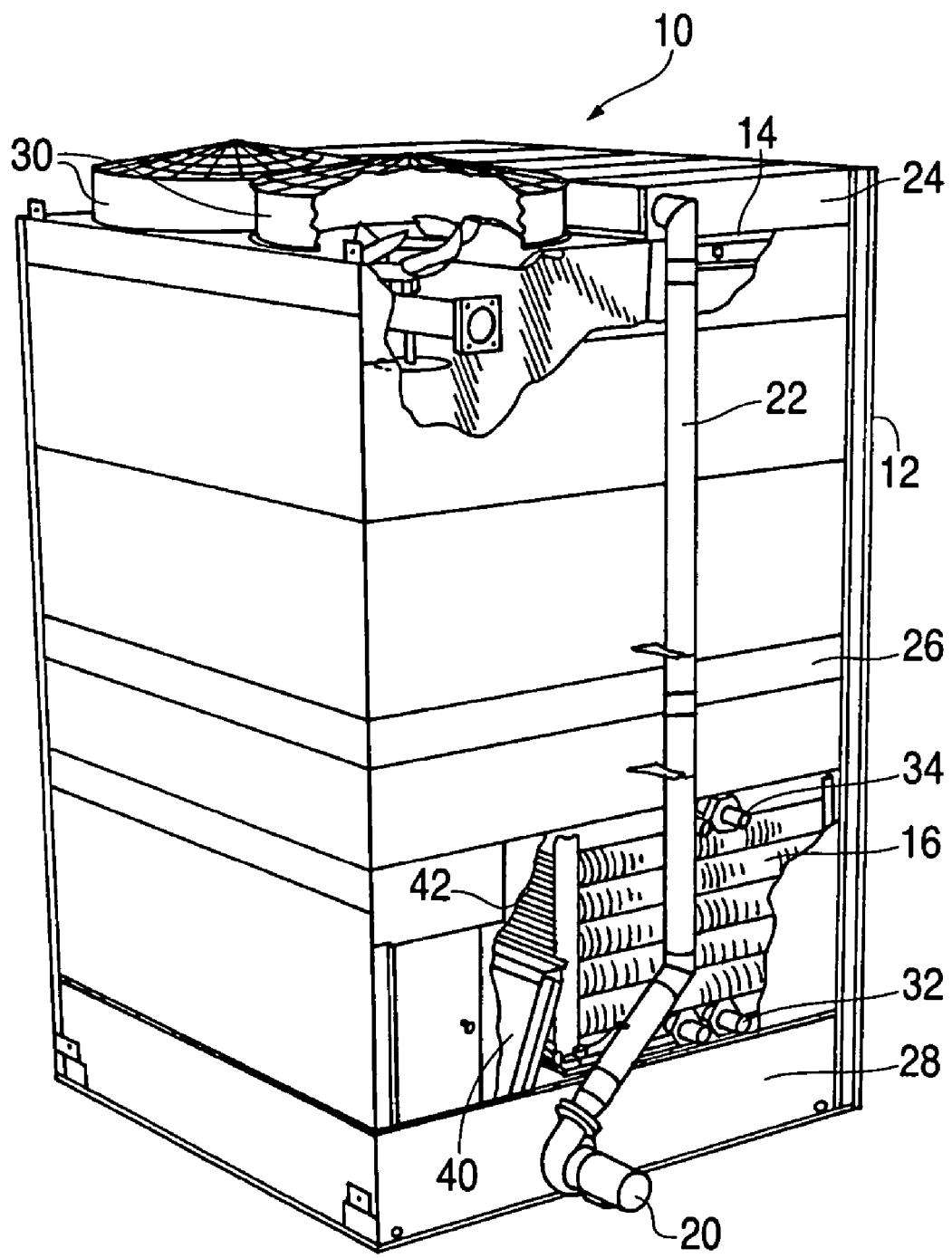
FIG. 1 is a perspective view of a cooling tower according to a preferred embodiment of the present invention.

Some preferred embodiments of the invention will now be described with reference to the drawing figures, in which like reference numerals refer to like elements throughout. Turning to FIG. 1, a cooling tower 10 is shown having a cabinet 12 surrounding a upper fill media 14. This upper fill media material 14 may preferably be an evaporative fill material, and may more preferably be a film type fill pack comprised of a number of thin fill sheets, with each fill sheet having features such as for example ribs, spacers, and/or integral louvers and eliminators.

The space below the upper fill media 14 includes a lower serpentine conduit heat exchanger arrangement 16. The lower serpentine heat exchanger arrangement 16 may however be any type of, typically, closed loop, fluid cooling arrangement such as for example a parallel system having a number of parallel horizontal circuits arranged in vertical coil rows. The coils may be useful to cool any fluids, but may be typically used to cool water, water/glycol mixtures, oil or other fluids, particularly those compatible with carbon steel, which is one preferred material for fabrication of the coils. This patent specification will refer to "cooling water" to indicate the recirculated liquid that falls through the fill media 14 and/or in contact with the air and which then falls over the lower heat exchanger 16. The word "fluid" will be used to refer to the liquid being cooled by traveling inside the lower heat exchanger 16. Of course one or both liquids may or may not be water.

A pump 20 pumps circulating cooling water through a vertical supply tube 22 and into an upper distribution basin 24. The upper distribution basin 24 has distribution nozzles which spray cool water onto and through the upper fill material 14. The cooling water, which is relatively warm at this point, has its temperature reduced by passing through the upper fill material 14, due to a number of effects including contact with air and evaporation. This water, which is now relatively cooler, drops from the bottom of the upper fill material 14 into an intermediate water distribution assembly 26.

The intermediate water distribution assembly 26 may accomplish one or more of several functions, including for example (1) collecting the cooling water, (2) evenly redistributing the cooling water onto the lower heat exchanger 16, (3) mixing the cooling water in the intermediate water distribution assembly 16 to reduce thermal gradients of the collected cooling water, (4) collecting debris from the cooling water, and/or (5) providing an air baffle to separate the air flow passing through the upper fill material 14 from the air flow passing through the lower heat exchanger 16.

The cooling water which is distributed by the intermediate water distribution assembly 26 next passes over the lower heat exchanger 16, thereby cooling the fluid being cooled by the lower heat exchanger 16. The cooling water, after it passes through the lower heat exchanger 16, then falls into a lower collection basin 28, from which it is recirculated by the pump 20 back up through the supply tube 22 and into the upper distribution basin 24.

A cooling tower typically has one, two or three fans to move air. In the illustrated embodiment, two fans 30 are provided at the top of the cooling tower 10 to provide a cross-flow air draw over both the upper fill material 14 and generally co-current air flow through the lower heat exchanger 16 as will be described in more detail below, and fluid to be cooled is provided via one or more inlets 32 to the lower heater exchanger 16 and after it is cooled is outlet through one or more outlets 34 from the lower heat exchanger. A drift eliminator 40 and sidewall barrier 42 are provided on the interior adjacent the side of the lower heat exchanger 16 and will be described in further detail below. If the coil is used as a condenser the inlet and outlets would be preferred to be oriented opposite from described above.

Figure 2:
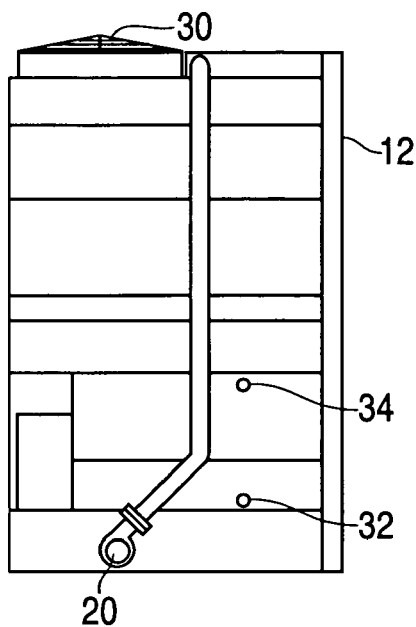
FIG. 2 is a side view of the cooling tower of FIG. 1.
Figure 3:
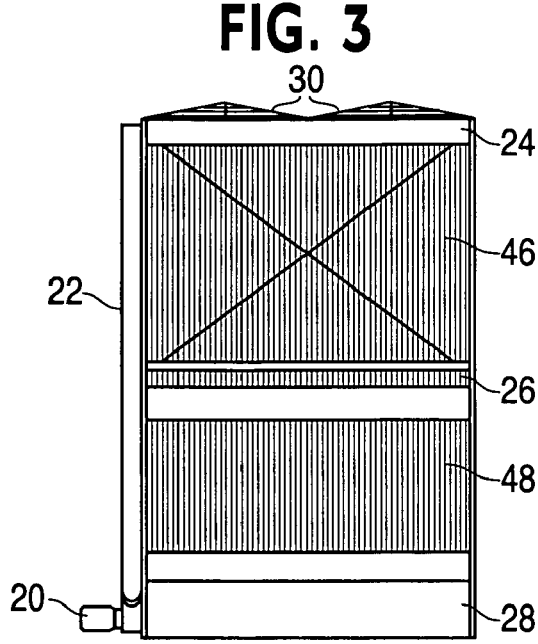
FIG. 3 is a front view of the cooling tower of FIG. 1.
Figure 4:
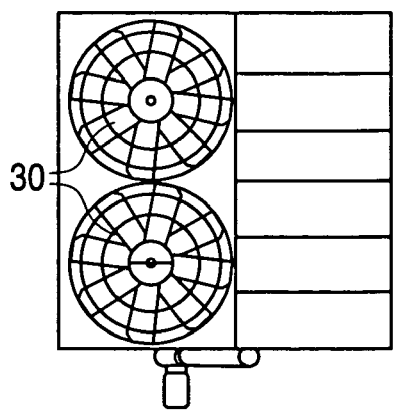
FIG. 4 is a top view of the cooling tower of FIG. 1.

FIGS. 2, 3 and 4 illustrate the cooling tower of FIG. 1 from different angles, and in particular, FIG. 3 illustrates an upper air inlet 46 which provides for the ingress of air into the cooling tower 10 to be exposed to the upper evaporative fill 14, and a lower air inlet 48 which provides for the inlet of air into the cooling tower 10 so that it passes over the lower heat exchanger coil unit 16.

Figure 5:
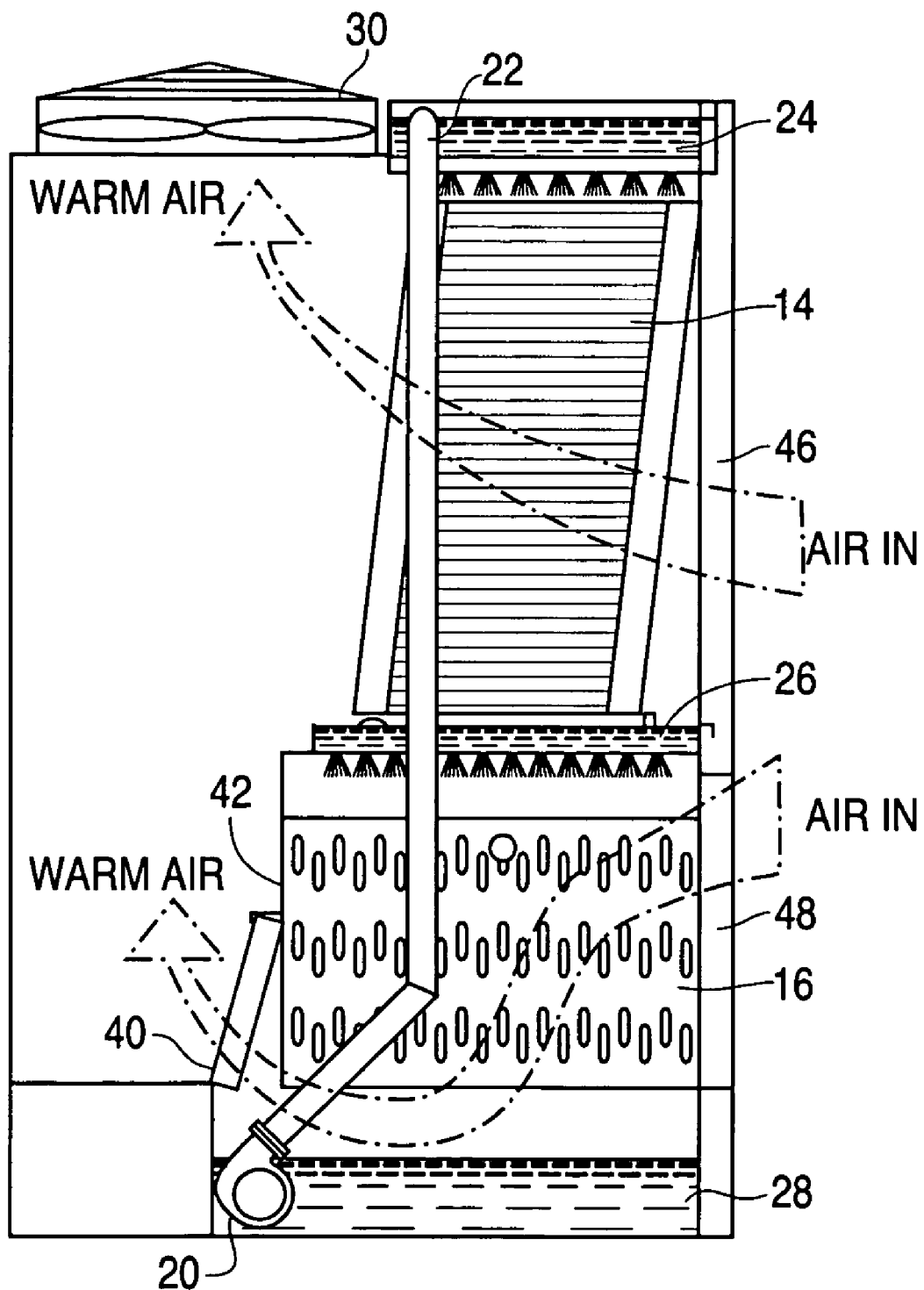
FIG. 5 is a schematic side view of the cooling tower of FIG. 1.

Turning to FIG. 5, the overall operation of the cooling tower 10 can be seen in more detail. In particular, the fans 30 provide a pressure differential drawing air upward and out of the cooling tower. Thus, in the upper portion of the cooling tower, air is drawn into the air inlet 46 and passes across the upper fill media 14, before exiting the fill media 14 and being drawn upward and outward from the tower. The relatively warm cooling water which is pumped into the upper water distribution system 24, exits through nozzles and falls over the upper evaporative fill pack 14, is cooled by transportation therethrough, and is collected in the intermediate water distribution assembly 26.

Figure 6:
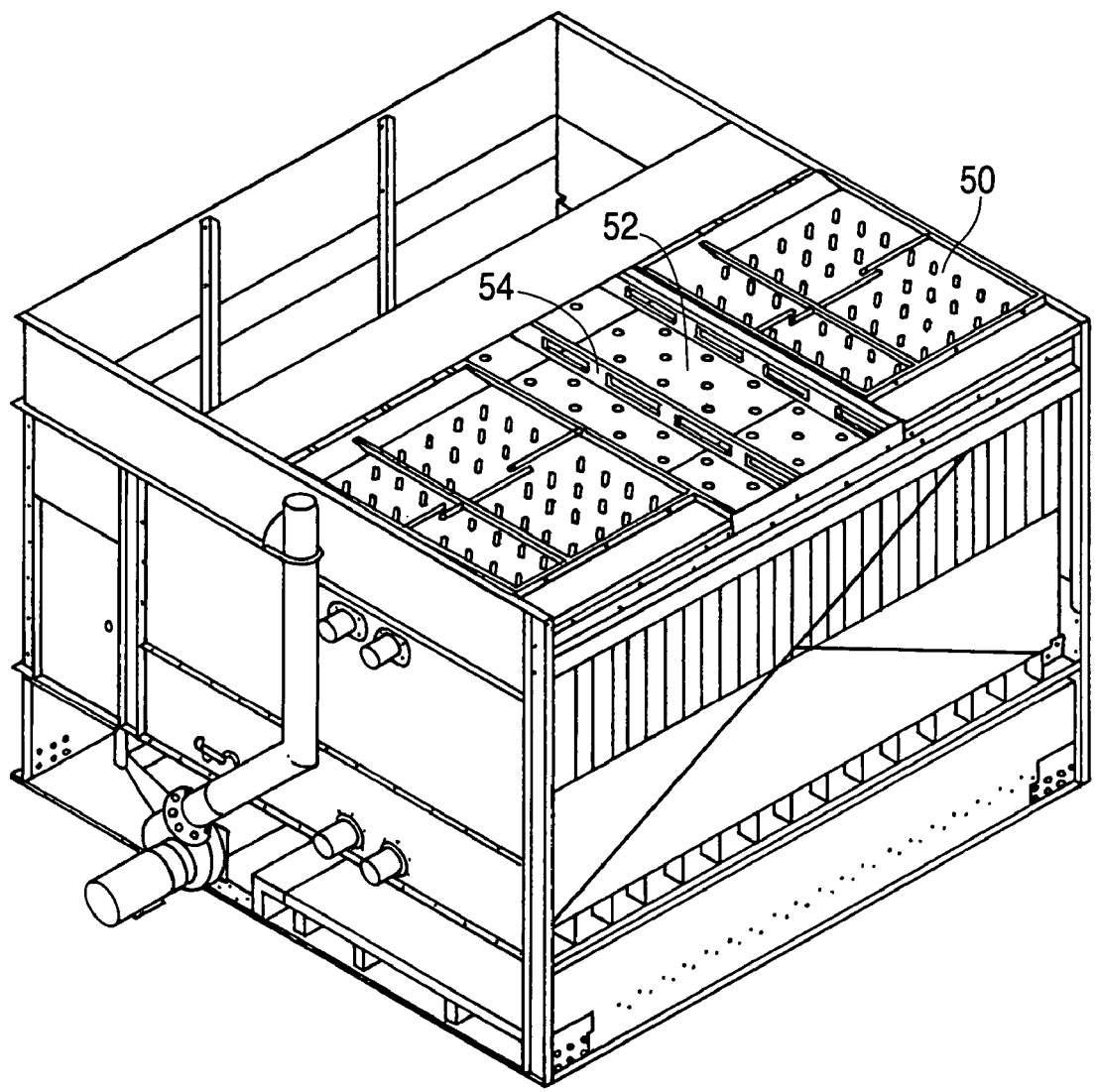
FIG. 6 is a perspective view and shows an intermediate water distribution assembly.
Figure 7:
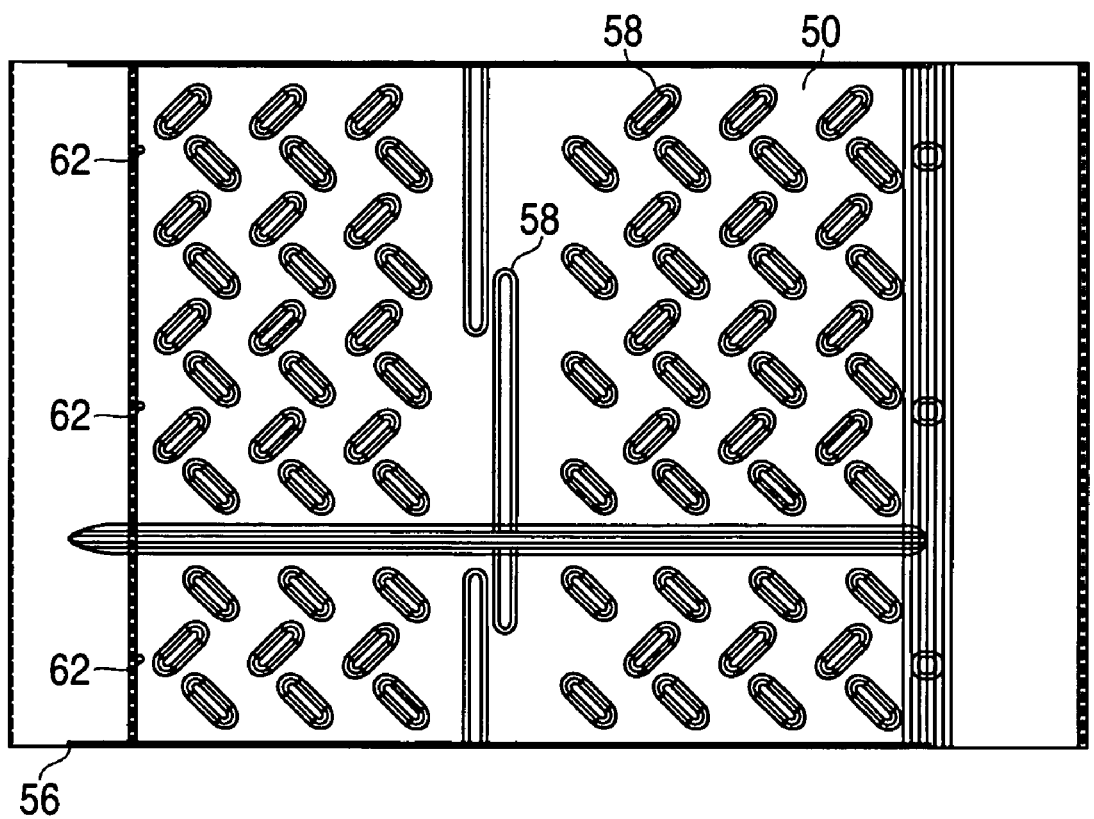
FIG. 7 is a top view of a thermal equalizing cover of the intermediate water distribution assembly.
Figure 8:
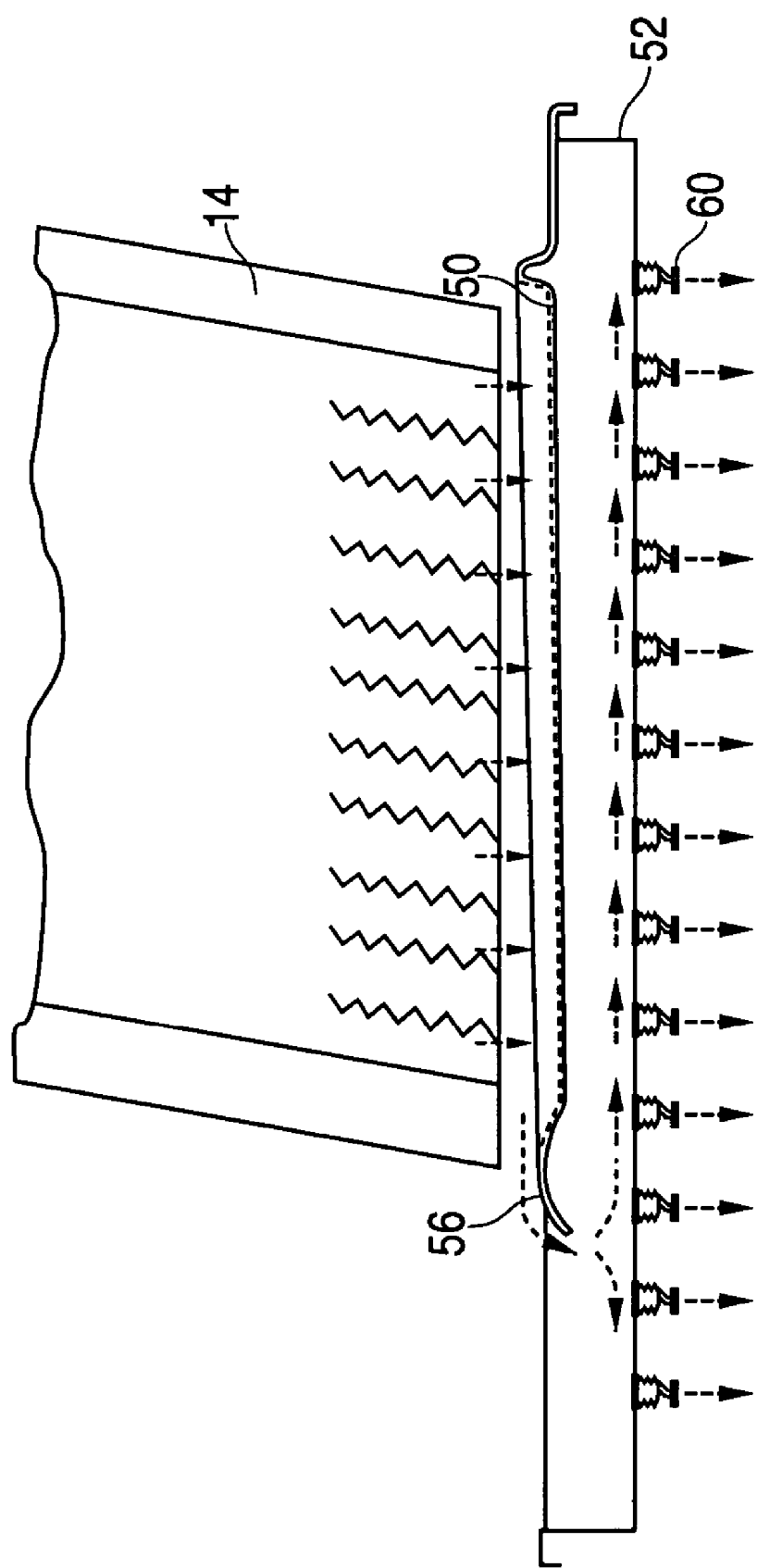
FIG. 8 is a side cross-sectional schematic view of the intermediate water distribution assembly.

The intermediate water distribution assembly 26 will now be described in more detail with particular reference to FIGS. 6, 7 and 8. The assembly 26 includes a cover 50 and an intermediate basin 52 with the cover 50 supported over the basin 52 by support beams 54. The cover 50 is relatively flat but is positioned to be generally downwardly sloping towards one end, which end has a gently convex lip 56. Water which falls off the upper fill 14 is collected first by the thermal equalizing cover 50, and as it flows downward across the cover 50 tends to get mixed together by a number of upperly protruding dimples or ribs 58 which facilitates mixing of the water together. Next, the water travels off of the lip 56 and falls into the intermediate basin 52. The intermediate basin 52, which is in the form of a tray, has a plurality of nozzles 60 which distribute the water down onto the lower heat exchanger 16.

As noted above, the intermediate water distribution assembly 26 performs several functions. First, the assembly 26 is designed so that the cooling water that is collected is mixed to a more even temperature before it leaves the assembly 26. Thus, the cooling water which falls with a horizontal thermal differential from the upper fill media 14 is mixed together. Further, the intermediate basin 26 has nozzles 60 evenly arranged thereon and therefore is able to provide not only an even thermal distribution, but an even water volume distribution over the lower heater exchanger 16. In addition, the intermediate water distribution assembly 26 provides an opportunity to collect and retain debris or other large solid material, and the cover 50 may be constructed to be easily removeable, thereby providing an easy location for removal of debris. The cover 50 is also preferably designed with a gently sloping bottom, and with one or more small drain holes 62. The slope is gentle enough that a relatively even head is collected during operation, but so that when the flow is shut down thin pools of water are avoided and rather the water drains simply and efficiently from cover 50 via the drain holes 62 when the tower is not in operation. The slope angle if the bottom of the cover 50 may for example preferably be 1 to 2 degrees from horizontal.

The relatively cool cooling water after it is distributed by the intermediate water distribution assembly 26 passes over the lower heat exchanger 16, picking up heat and evaporatively exchanging heat to air while doing so, and falls into the lower collection basin 28, from which it is recirculated by the pump 20.

The intermediate water distribution assembly 26 performs a further function of separating the two major air flows of the cooling tower 10. That is, the intermediate distribution assembly 26 separates the upper air flow, which is passing across the upper fill material 14 from the lower air flow which is passing over the lower heat exchanger 16.

Figure 9:
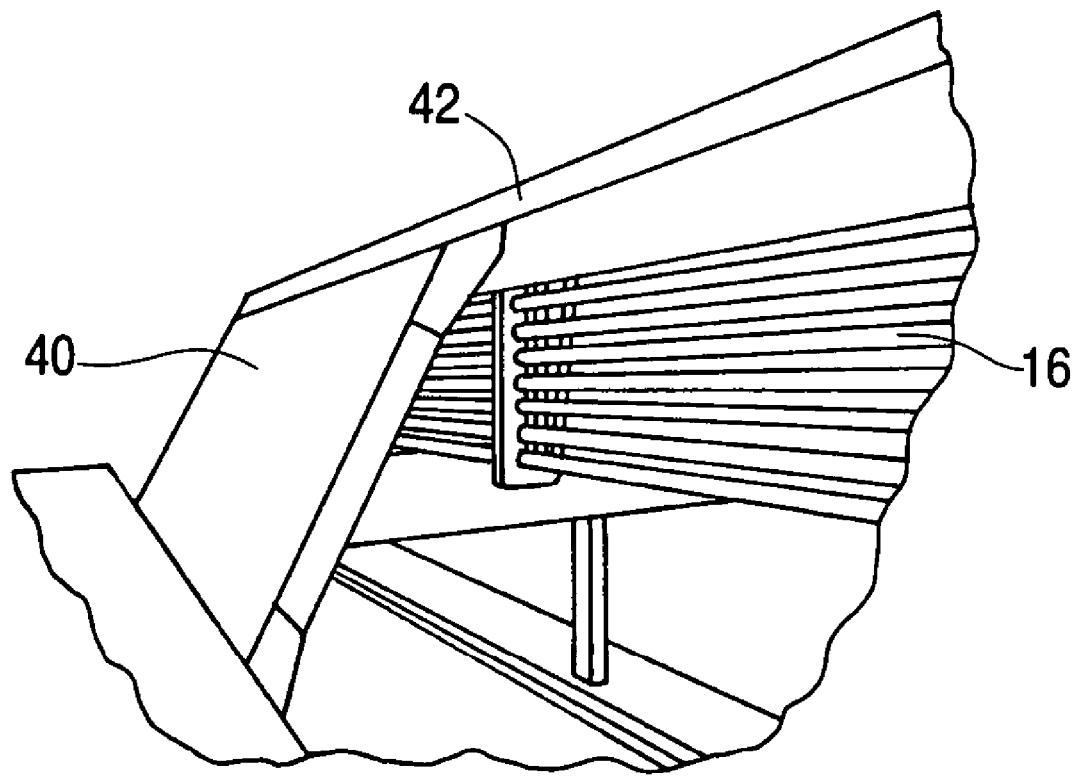
FIG. 9 is a perspective view of a drift eliminator, cut away to show a lower portion of the serpentine coil.

The lower heat exchanger 16 has at its air outlet side a side wall barrier or baffle 42, and a drift eliminator 40 disposed in the angled orientation generally shown in FIGS. 5 and 9. The structure of the drift eliminator 40 itself otherwise may preferably be similar to the cellular drift eliminator design described in U.S. Pat. No. 4,514,202, the disclosure of which is hereby incorporated by reference in its entirety. The drift eliminator 40 can be described as having a major flow axis across its width, which, in the illustrated embodiment is tilted relative to horizontal as described below by tilting the drift eliminator 40. As described in U.S. Pat. No. 4,574,202, the eliminator 40 exits air at an upward angle compared to its major flow axis at an upward angle of 10 to 60 degrees and more preferably 30 degrees. This provides several advantageous benefits, including causing the air to not only have co-current flow through the coils but also having a somewhat crossflow component. The bottom of the coils of the lower heater exchanger 16, are spaced above the lower basin 28 so that some air can pass thereunder and then upward through the drift eliminator 40. It has been found that positioning the drift eliminator 40 at an angle of at approximately 15 to 45 degrees from vertical, and more preferably 30 degrees, can be very advantageous in this exemplary type of arrangement. The air is then turned by the overall tilt angle, and is further turned by the additional exit air angle of the drift eliminator 40. At this angle the direction the air leaves the eliminator and is directed towards the fan/s providing the least amount of air turning loss. In particular, the angled orientation of the eliminator helps "turn" the air flow separately so that it does not "crash" into the back wall. This lower pressure drop resulting from the eliminator turning device lowers the overall system pressure drop and hence the fan power needed.

Figure 10:
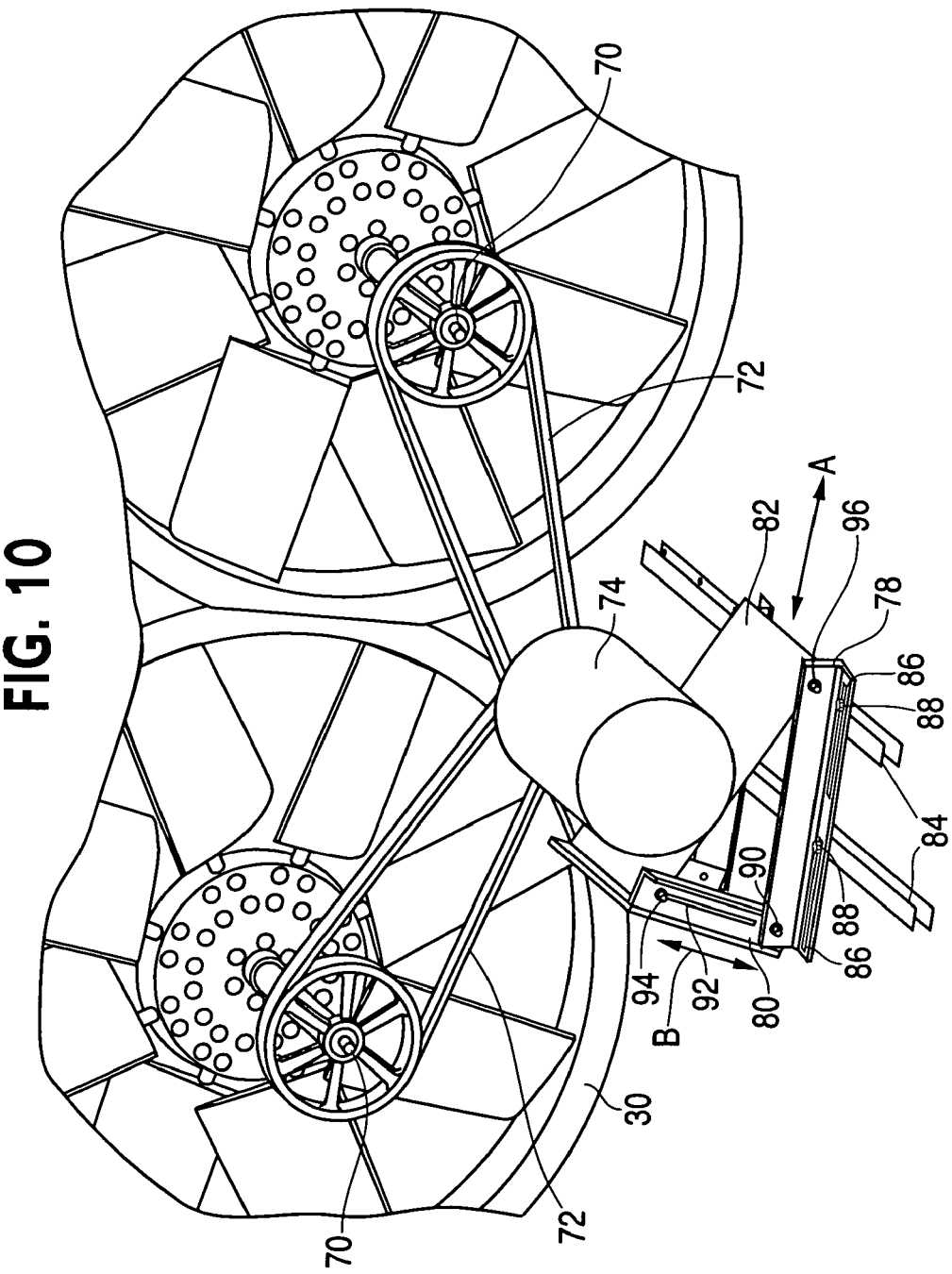
FIG. 10 is a perspective diagram of a motor capable of driving two fans, with an adjustment mechanism.

Turning to FIG. 10, a drive mechanism for driving two fans 30, each having a drive belt, with both belts commonly driven by a single motor pulley will now be described in more detail.

Figure 11:
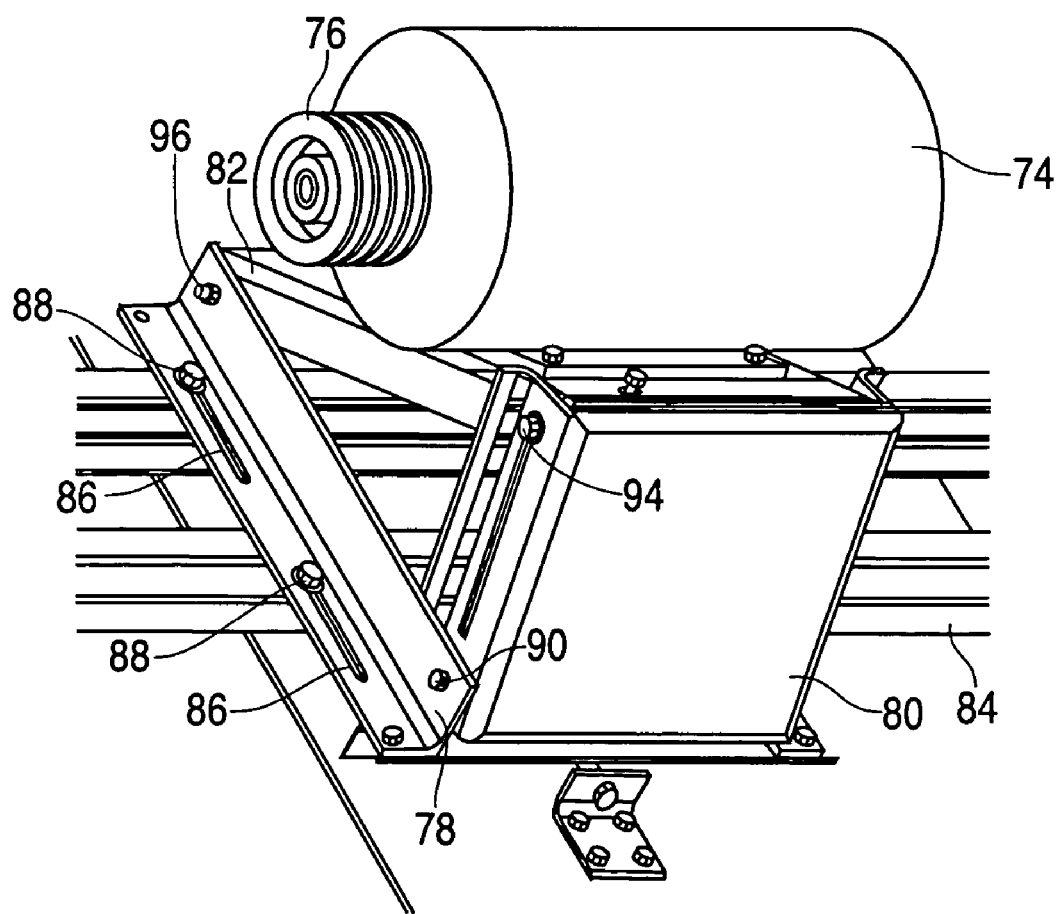
FIG. 11 is a perspective view taken from another angle, of the adjustment mechanism and motor shown in FIG. 10.

FIG. 10 depicts a pair of parallel fans 30 each having respective fan pulley 70 driven by a respective belt, such as for example a V-belt, 72. The drive motor 74 (having a drive pulley 76 as shown in FIG. 11) is mounted by an assembly including a sliding lower bracket 78, a pivoting angle bracket 80, and a pivoting mounting plate 82. This arrangement allows the motor 74 to be mounted to a structure such as parallel supports 84, which is fixedly attached to or is part of the cooling tower 10. The lower bracket 78 has elongated slots 86 which each accept a respective bolt 88. The elongated slots 86 allow lateral adjustment of the pulley position in the direction shown by the arrows labeled A.

The pivoting angle bracket 80 pivots around a bolt 90 freely. A slot 92 in the pivot bracket 80 accepts a bolt 94 attached to the mount plate 82. The mounting plate 82 also pivot about a bolt 96, and can be adjusted in the direction shown by the arrows labeled B.

By manipulating these two degrees of freedom, an operator can quickly and easily position the motor 64 so that both belts have a relatively equal tension. At this point, the bolts 94 and the bolts 88 can be tightened locking the arrangement into position. It is noted that as long as the bolts 94 is tightened, the bolts 96 and 90 do not need to be tightened to resist pivoting, because the triangular relationship will keep the assembly in place. However, it may be desirable to tighten the bolts 96 and 90 also to provide further resistance to either direction movement.

It has been found that using this angular pivoting design to achieve a degree of freedom in the direction B makes it often much easier for an operator when attempting to adjust the system. Thus, the invention takes advantage of the arc-swing type pivot dynamics in order to provide for a more easy and convenient adjustment. FIG. 11 shows the arrangement of FIG. 10 from a different perspective.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A cooling tower apparatus, comprising:
   a housing structure having an internal chamber with two sides defining its width and an upper side air inlet and a lower side air inlet and a top air outlet,
   an evaporative fill media having a first air path from the upper side air inlet through the fill media to the top air outlet;
   a supply of cooling water to the fill media;
   a closed circuit heat exchanger disposed below the evaporative fill media having a second air path from the lower side air inlet through the exchanger to the top air outlet;
   a baffle disposed in between the fill media and the heat exchanger that at least substantially separates the first and second air paths from each other said baffle comprising a tray that collects water from the evaporative fill media and has nozzles to redistribute the collected water onto the heat exchanger; and
   an air drift reducer disposed adjacent the heat exchanger, the drift reducer having an axis of orientation perpendicular to a major air flow axis, wherein the axis of orientation of the drift reducer is angled relative to the vertical direction, wherein the baffle, the fill media, and the heat exchanger each extend across less than the width of the chamber, so that the first and second air paths mix before exiting the top air outlet.

2. The apparatus according to claim 1, wherein the axis of orientation of the drift reducer is angled between approximately 15 and 45 degrees from vertical.

3. The apparatus according to claim 1, wherein the axis of orientation of the drift reducer is angled at approximately 30 degrees from vertical.

4. The apparatus according to claim 1, wherein the drift reducer exits air at an upward angle relative to a horizontal direction.

5. A cooling tower apparatus, comprising:
   a housing structure having an internal chamber with two sides defining its width and an upper side air inlet and a lower side air inlet and a top air outlet;
   evaporative water cooling means having a first air path from the upper side air inlet through the cooling means to the top air outlet;
   means for supplying cooled water to the cooling means;
   a closed circuit heat exchanging means disposed below the evaporative water cooling means having a second air path from the lower side air inlet through the exchanging means to the top air outlet;
   baffle means for at least substantially separating the first and second air paths, disposed between the cooling means and the heat exchanging means said baffle comprising a tray that collects water from the evaporative water cooling means and has nozzles to redistribute the collected water onto the heat exchanger; and
   means for reducing drift disposed adjacent the heat exchanging means, the drift reducing means having a major air flow axis and an exit air flow direction, wherein the major air flow axis of the drift reducing means is angled relative to the vertical direction, wherein the baffle, the water cooling means, and the heat exchanging means each extend across less than the width of the chamber, so that the first and second air paths mix before exiting the top air outlet.

6. The apparatus according to claim 5, wherein the major air flow axis of the drift reducing means is angled between approximately 15 and 45 degrees from vertical.

7. The apparatus according to claim 5, wherein the major air flow axis of the drift reducing means is angled at approximately 30 degrees from vertical.

8. The apparatus according to claim 5, wherein the drift reducing means comprises means for exiting air at an angle relative to the major air flow axis.

9. A method for cooling a fluid, comprising:
   a housing structure having an internal chamber with two sides defining its width and an upper side air inlet and a lower side air inlet and a top air outlet;
   passing cooling water over an evaporative fill media;
   passing air through a first air path from the upper side air inlet through the fill media to the top air outlet;
   passing fluid to be cooled through a closed circuit heat exchanger;
   passing air through a second air path from the lower side air inlet through the exchanger to the top air outlet disposed below the evaporative fill media;
   at least substantially separating the first and second air paths from each other via a baffle said baffle comprising a tray that collects water from the evaporative fill media and has nozzles to redistribute the collected water onto the heat exchanger; and
   reducing drift via a drift reducer disposed adjacent the heat exchanger and turning the air via the drift eliminator being angled relative to vertical, wherein the baffle, the fill media and the heat exchanger each extend across less than the width of the chamber, so that the first and second air paths mix before exiting the top air outlet.

10. The method according to claim 9, wherein the air turning step includes turning the air via the drift reducer exiting air at an angle to its major air flow axis.

11. The method according to claim 10, wherein the drift reducer is angled between approximately 15 and 45 degrees from vertical.

12. The method according to claim 11, wherein the drift reducer is angled at approximately 30 degrees from vertical.

13. A cooling tower apparatus, comprising:
- a housing structure having an internal chamber with two sides defining its width and an upper side air inlet and a lower side air inlet and a top air outlet;
- an evaporative fill media having a first air path from the upper side air inlet through the fill media to the top air outlet;
- a supply of cooling water to the fill media;
- a closed circuit heat exchanger having a second air path from the lower side air inlet through the exchanger to the top air outlet disposed below the evaporative fill media; and
- a baffle between the fill media and the heat exchanger that at least substantially separates the first and second air paths said baffle comprising a tray that collects water from the evaporative fill media and has nozzles to redistribute the collected water onto the heat exchanger, wherein the baffle, the fill media, and the heat exchanger each extend across less than the width of the chamber, so that the first and second air paths mix before exiting the top air outlet.

14. The apparatus according to claim 13, further comprising a drift reducer disposed adjacent the heat exchanger.

15. The apparatus according to claim 14, wherein the drift reducer is angled relative to the vertical direction.

16. The apparatus according to claim 15, wherein the drift reducer is angled between approximately 15 and 45 degrees from vertical.

17. The apparatus according to claim 16, wherein the drift reducer is angled at approximately 30 degrees from vertical.

18. A method for cooling a fluid, comprising:
- providing a housing structure having an internal chamber with two sides defining its width and an upper side air inlet and a lower side air inlet and a top air outlet;
- passing cooling water over an evaporative fill media having a first air path from the upper side air inlet through the fill media to the top air outlet;
- passing fluid to be cooled through a closed circuit heat exchanger disposed below the evaporative fill media having a second air path from the lower side air inlet through the exchanger to the top air outlet;
- at least substantially separating the first and second air paths from each other via a baffle said baffle comprising a tray that collects water from the evaporative fill media and has nozzles to redistribute the collected water onto the heat exchanger, wherein the baffle, the fill media, and the heat exchanger each extend across less than the width of the chamber, so that the first and second air paths mix before exiting the top air outlet.

* * * * *